United States Patent
Pae et al.

(10) Patent No.: US 7,310,289 B2
(45) Date of Patent: Dec. 18, 2007

(54) ACTUATOR FOR OPTICAL PICKUP OF AN OPTICAL DISK DRIVE AND A METHOD OF USING THE SAME

(75) Inventors: Jung-gug Pae, Suwon-si (KR); Bong-gi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 565 days.

(21) Appl. No.: 10/912,095

(22) Filed: Aug. 6, 2004

(65) Prior Publication Data

US 2005/0063258 A1    Mar. 24, 2005

(30) Foreign Application Priority Data

Sep. 18, 2003 (KR) ...................... 10-2003-0064648

(51) Int. Cl.
*G11B 7/00* (2006.01)
(52) U.S. Cl. ................................ 369/44.14; 369/44.32
(58) Field of Classification Search ............ 369/44.32, 369/44.14, 44.15, 44.16, 44.2, 44.21
See application file for complete search history.

(56) References Cited

U.S. PATENT DOCUMENTS 5,777,972 A * 7/1998 Furusawa .............. 369/112.01

FOREIGN PATENT DOCUMENTS

| JP | 10-124896 | 5/1998 |
|---|---|---|
| JP | 11-283258 | 10/1999 |
| JP | 2000-113482 | 4/2000 |
| JP | 2001-110075 | 4/2001 |
| KR | 2001-0064312 | 7/2001 |
| KR | 010064312 | 7/2001 |
| KR | 1020020038845 | 5/2002 |
| KR | 2002-0080169 | 10/2002 |
| KR | 1020020080169 | 10/2002 |
| KR | 2002-0096297 | 12/2002 |
| KR | 1020020096296 | 12/2002 |
| KR | 1020030021356 | 3/2003 |
| KR | 1020030060326 | 7/2003 |

* cited by examiner

*Primary Examiner*—Nabil Hindi
(74) *Attorney, Agent, or Firm*—Roylance, Abrams, Berdo & Goodman LLP

(57) ABSTRACT

An actuator and a method of operating an optical pickup of an optical disk drive comprises a blade on which an object lens is mounted, a plurality of magnets for generating a magnetic field, a plurality of focusing coils for interacting with the magnetic field generated at the magnets to move the blade in a first direction, a tracking coil for interacting with the magnetic field generated at the magnets to move the blade in a second direction, a first supporting member for supporting the blade so that the blade is tilted by the difference in electromagnetic forces which are generated between the magnets and the focusing coils, and a second supporting member connected to the first supporting member, for movably supporting the blade in the first and the second directions. Accordingly, the blade tilts in the tangential direction by adjusting the electric current supplied to the focusing coil.

31 Claims, 3 Drawing Sheets

ACTUATOR FOR OPTICAL PICKUP OF AN OPTICAL DISK DRIVE AND A METHOD OF USING THE SAME

CROSS-REFERENCE TO RELATED APPLICATIONS

This application claims the benefit under 35 U.S.C. § 119(a) of Korean Patent Application No. 2003-64648, dated Sep. 18, 2003, in the Korean Intellectual Property Office, the entire contents of which is incorporated herein by reference.

BACKGROUND OF THE INVENTION

1. Field of the Invention

The present invention relates to an optical pickup device used in an optical disk drive. More particularly, the present invention relates to an actuator for an optical pickup of an optical disk drive capable of tilting in a tangential direction of an optical disk and a method thereof.

2. Description of the Related Art

Generally, an optical disk drive (ODD) records and reproduces information by focusing light beams onto an optical recording medium such as a compact disk (CD), and a digital versatile disc (DVD). Various types of optical disk drives are available, such as a compact disc recordable (CD-R) for reproducing information from a CD, a compact disc re-writable (CD-RW) for recording information on a CD and reproducing recorded information, a digital versatile disc recordable (DVD-R) for reproducing information from a DVD, and a digital versatile disc rewritable (DVD-RW) for recording information on a DVD and reproducing recorded information. Such an optical disk drive includes an object lens for focusing light beams onto an optical disk, and an optical pickup actuator for driving the object lens in order for a spot of the light projected from the object lens to trace around a center of a signal track of the optical disk.

FIG. 1 illustrates an actuator for an optical pickup of a conventional optical disk drive.

As shown in FIG. 1, the actuator for the conventional optical pickup is positioned under an optical disk 'd' illustrated by a dash-double-dot line, and includes a holder 20 fixed to a base 10, a blade 40 movably supported by the holder 20 through a plurality of wire suspensions 30 connected to the holder 20 and mounting an object lens L thereon, a focusing coil 50 and a tracking coil 60 both disposed on the blade 40 to drive the object lens L in a focusing direction A and a tracking direction B, a magnet 70 for generating a magnetic field interacting with electric currents flowing through the focusing coil 50 and the tracking coil 60, and a yoke 80 for supporting the magnet 70.

The actuator moves the object lens L in the focusing direction A and the tracking direction B by electromagnetic forces generated between the focusing and the tracking coils 50 and 60 and the magnet 70. As an electric current is applied to the focusing coil 50, the electric current of the focusing coil 50 interacts with the magnetic field of the magnet 70 to generate an electromagnetic force. Due to the electromagnetic force, the blade 40 moves in the focusing direction A, and therefore, moves towards or away from the optical disk 'd'. Accordingly, a light spot of the light projected from the object lens L is focused onto a signal track of the optical disk with a predetermined size. Also, as the electric current is applied to the tracking coil 60, the electric current of the tracking coil 60 interacts with the magnetic field of the magnet 70 to generate an electromagnetic force. Due to the electromagnetic force, the blade 40 moves in the tracking direction B, and therefore, moves towards or away from the center of the optical disk 'd'. Accordingly, the light spot traces the signal track of the optical disk without deflecting from the correct signal track.

Meanwhile, it is ideal that a recording surface of the optical disk is level. However, the recording surface is often warped in the manufacturing process. Also, since the blade 40 is hung on one end of the wire suspension 30, rolling occurs during the focusing and the tracking operations. Rolling is a phenomenon in which the blade 40 shakes vertically, and mainly includes a radial direction rolling and a tangential direction rolling. The deflection error and the rolling phenomenon results in the distance between the object lens to the optical disk 'd' changing and also the light spot to deflect from the signal track.

For compensation, an actuator is required, which is capable of compensating for the error of the radial direction and has been developed and disclosed by the same assignee of this application in U.S. Publication No. 2002150002, dated Oct. 17, 2002, titled "Optical pickup and method of assembling the optical pickup", the entire contents of which is incorporated herein by reference. In the cited reference, the magnets are arranged to deflect from a centerline of the drive force by a predetermined distance in order for the drive force of the focusing direction to be applied to the blade in a non-symmetric manner.

However, the actuator has a problem in that it cannot compensate for the error when the optical disk deflects in a tangential direction or an error in the tangential direction rolling in the blade 40 as shown in FIG. 2, in which T and M respectively denote a turntable T on which the optical disk 'd' is mounted and a motor M for rotating the turntable.

SUMMARY OF THE INVENTION

The present invention has been developed in order to solve the above problems in the related art. Accordingly, it is an aspect of the present invention to provide an actuator for an optical pickup which is capable of tilting in a tangential direction to compensate for an error when an optical disk 'd' deflects from a level state in a tangential direction or when an error in a tangential direction rolling in a blade occurs and a related method of operating an optical pickup.

The above aspect is achieved by providing an actuator and a method of operating an optical pickup of an optical disk drive. The actuator and method comprise a blade on which an object lens is mounted, a plurality of magnets for generating a magnetic field, a plurality of focusing coils for interacting with the magnetic field generated at the magnets to move the blade in a first direction, a tracking coil for interacting with the magnetic field generated at the magnets to move the blade in a second direction, a first supporting member for supporting the blade so that the blade is tilted by the difference in electromagnetic forces which are generated between the magnets and the focusing coils, and a second supporting member connected to the first supporting member, for movably supporting the blade in the first and the second directions.

The focusing coils include a first focusing coil and a second focusing coil provided at opposite ends of the blade. The difference in electric currents flowing through the first and the second focusing coils causes the difference in electromagnetic forces generated between the first focusing coil and the magnets and between the second focusing coil and the magnets, so that the blade tilts with respect to the second supporting member. The difference in electromagnetic forces generated between the first focusing coil and the magnets and between the second focusing coil and the magnets may be caused by a gap between the respective focusing coils and the magnets.

The first and the second focusing coils and the tracking coils are disposed on the blade, and the magnets are disposed on a base. Alternatively, the first and the second focusing coils and the tracking coils may be disposed on the base, and the magnets may be disposed on the blade.

The second supporting member may comprise a pair of first wire suspensions connected to the blade, for applying an electric current to the first focusing coil, a pair of second wire suspensions connected to the blade, for applying an electric current to the second focusing coil; and a pair of third wire suspensions connected to the blade, for applying an electric current to the tracking coil. A pair of connection members are provided between the other ends of the first through the third wire suspensions and the blade. The first through the third wire suspensions support the connection members, and the connection members are connected with the first supporting member.

The blade may be constructed to move in an asymmetric manner with respect to a focusing direction, so that the blade tilts in a radial direction. To move the blade in the asymmetric manner with respect to the focusing direction, two methods are available. One is to space the magnets apart from a centerline of the blade by a predetermined distance, and the other is to dispose two second supporting members having different levels of rigidity at opposite sides of the blade.

According to another embodiment of the present invention, an actuator for an optical pickup and a related method of operating an optical pickup of an optical disk drive comprise a blade elastically supported by a holder through a supporting member, a focusing coil and a tracking coil disposed on the blade to move the blade in a focusing direction and a tracking direction, and a magnet for generating a magnetic field to interact with electric currents flowing through the focusing coil and the tracking coil. The focusing coil includes first and second focusing coils respectively disposed at opposite ends of the blade. The magnet includes a first magnet for interacting with the first focusing coil and a second magnet for interacting with the second focusing coil. The blade is tilted in a tangential direction due to a difference in electromagnetic forces which are generated between the first focusing coil and the first magnet and between the second focusing coil and the second magnet.

BRIEF DESCRIPTION OF THE DRAWINGS

The above aspect and other advantages of the present invention will be more apparent by describing embodiments of the present invention with reference to the accompanying drawings, in which.

Throughout the drawings, it should be noted that the same or similar elements are denoted by like reference numerals.

DETAILED DESCRIPTION OF THE EXEMPLARY EMBODIMENTS

Figure 1:
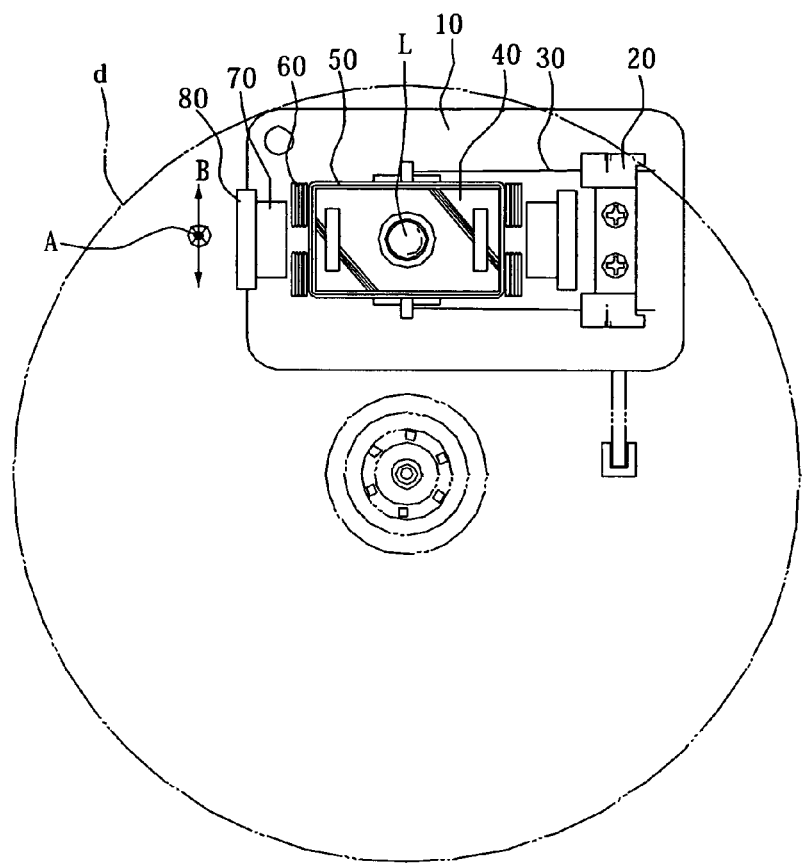
FIG. 1 is a plan view showing an actuator for an optical pickup of a conventional optical disk drive.
Figure 2:
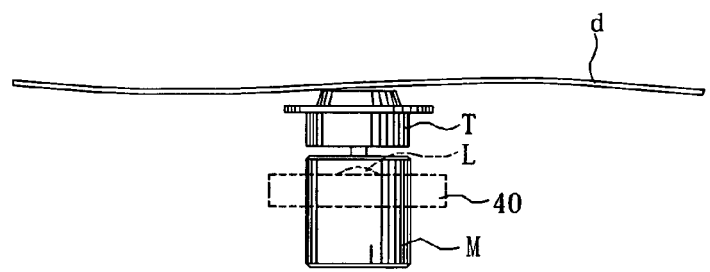
FIG. 2 is a side view showing an optical disk mounted on an optical disk drive, which is deflecting from a level state in a tangential direction.
Figure 3:
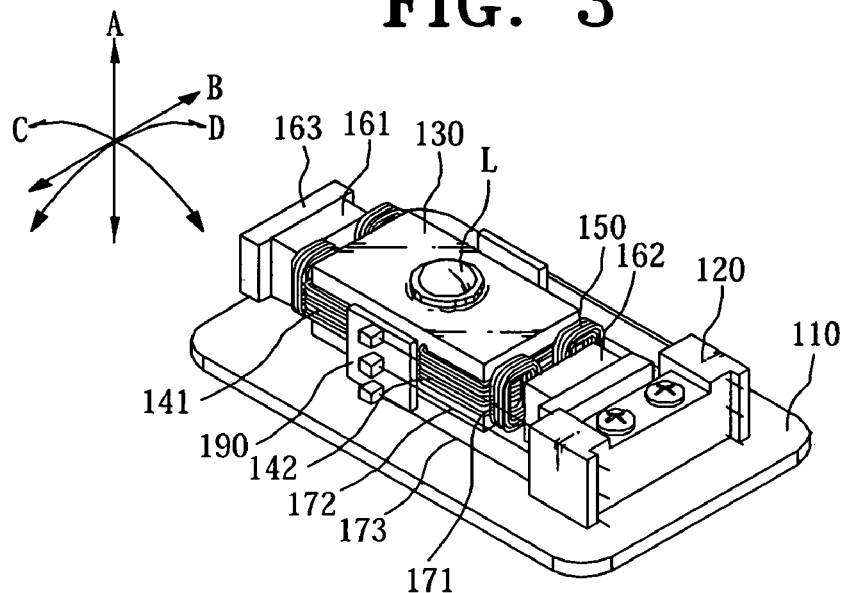
FIG. 3 is a perspective view showing an actuator for an optical pickup of an optical disk drive according to an embodiment of the present invention.

Hereinafter, an actuator for an optical pickup of an optical disk drive according to embodiments of the present invention will be described in greater detail with reference to the accompanying drawings.

Referring to FIGS. 3 to 6, an actuator for an optical pickup of an optical disk drive according to an embodiment of the present invention comprises a holder 120 disposed on a base 110, a blade 130 for elastically supported by the holder 120, first and second focusing coils 141, 142 and tracking coils 150 disposed on the blade 130, first and second magnets 161, 162 affixed to the base 110, first, second and third wire suspensions 171, 172, 173 for elastically biasing the blade 130, and serving as a second supporting member, and a tilting movement supporting member 180 for biasing the blade 130 in a tangential direction C, and serving as a first supporting member.

An object lens L for focusing light beams is mounted approximately on the center portion of the top surface of the blade 130. With reference to the object lens L, the first and the second focusing coils 141, 142 are wound around right and left opposing ends of the blade 130 in a substantially parallel direction to the base 110. The tracking coils 150 are wound around outer sides of the right and left opposing ends of the blade 130 in a substantially perpendicular direction to the base 110. Two pairs of tracking coils 150 (4 tacking coils) are respectively provided at the outer sides of the right and left opposing ends of the blade 130, and an electric current is provided to the 4 tacking coils 150 through the same path. The first focusing coil 141 and the second focusing coil 142 receive electric currents through different paths.

The first and the second magnets 161, 162 are disposed on the base 110 and opposed to each other with respect to the blade 130. Yokes 163 are integrally formed with the base 110 to support the first and the second magnets 161, 162. A magnetic gap is formed between the first magnet 161 and the first focusing coil 141 and the tracking coil 150. In the same manner, a magnetic gap is formed between the second magnet 162 and the second focusing coil 142 and the tracking coil 150. It is preferred that the magnetic gaps are identical to each other in order to generate the same level of electromagnetic force at the opposite ends of the blade 130.

The first, second and third wire suspensions 171, 172, 173 elastically bias the blade 130 to move both in a first direction (focusing direction A) and in a second direction (tracking direction B), and each comprise a metal having a certain level of rigidity. The first, second and third wire suspension 171, 172, 173 are each provided in pairs and disposed at front and rear of opposing ends of the blade 130 and oppose each other. The wire suspensions 171, 172, 173 each have one end fixed to the holder 120 and the other end connected to a connection member 190 connected to the blade 130. Also, the wire suspensions 171, 172, 173 are connected to an external power source, wherein the first wire suspension 171 applies an electric current to the first focusing coil 141, the second wire suspension 172 applies an electric current to the second focusing coil 142, and the third wire suspension 173 applies an electric current to the tracking coils 150.

Figure 4:
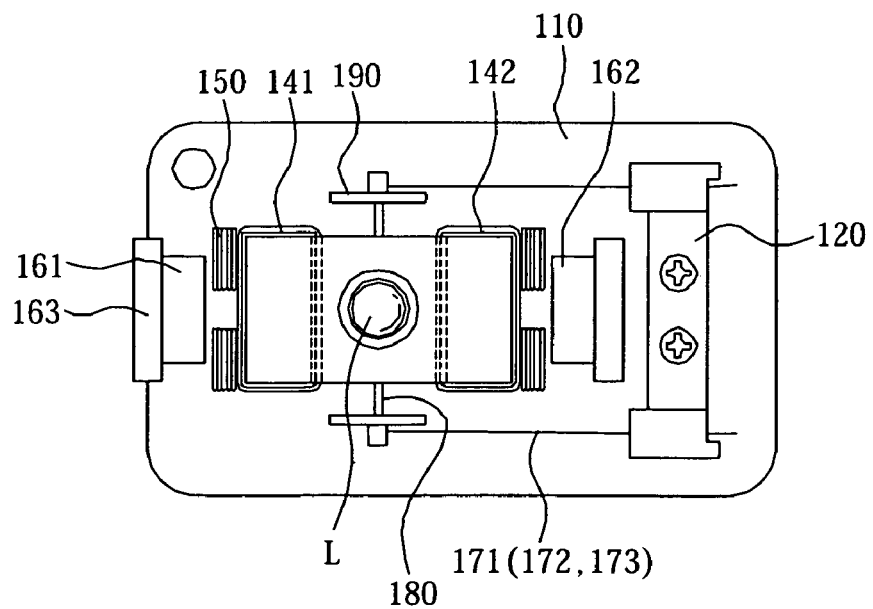
FIG. 4 is a plan view showing the actuator for the optical pickup of FIG. 3.
Figure 5:
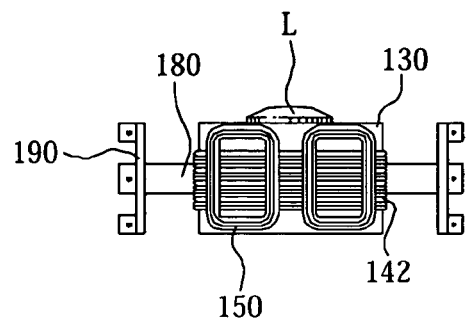
FIG. 5 is a side section view showing the main part of the actuator for the optical pickup of FIG. 3.
Figure 6:
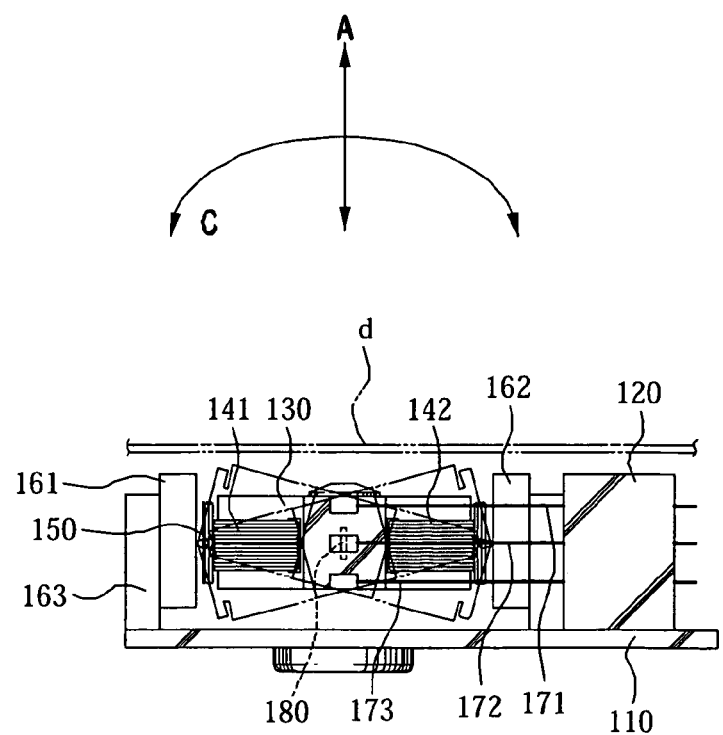
FIG. 6 is a side section view showing the actuator for the optical pickup of FIG. 3.

The tilting movement supporting member 180 supports the blade in a manner such that the blade 130 elastically moves in the tangential direction C. As shown in FIGS. 4 and 5, the tilting movement supporting member 180 is provided in pairs at front and rear opposing sides of the blade 130. The tilting movement supporting member 180 biases the blade 140, while being connected to the connection member 190. The tilting movement supporting member 180 is preferably a plate spring being larger in height than width so that it may not deflect the moving direction of the blade 40 when the blade 140 undergoes a translational motion in the focusing direction A.

Hereinafter, the operation of the actuator for the optical pickup according to an embodiment of the present invention will now be described.

If the same level of electric current is applied to the first and the second focusing coils 141, 142, the same level of electromagnetic force is generated between the first focusing coil 141 and the first magnet 161 and between the second focusing coil 142 and the second magnet 162. Due to the electromagnetic force, the wire suspensions 171, 172, 173 bend in the focusing direction A so that the blade 130 experiences a translational motion in the focusing direction A. The translational motion in the focusing direction A of the blade 130 is controlled in order for a gap between the optical disk 'd' and the object lens L to be constant, and accordingly, a light beam of the light emitted from the object lens L is focused onto a signal track of the optical disk 'd' with a predetermined size. Since the control operation with respect to the movement of the focusing direction A of the blade 130 is well known to those of skilled in the art, a detailed description will be omitted for conciseness.

Meanwhile, if different levels of electric current is applied to the first and the second focusing coils 141, 142, the electromagnetic force generated between the first focusing coil 141 and the first magnet 161 is different from that generated between the second focusing coil 142 and the second magnet 162. Accordingly, the tilting movement supporting member 180 is deformed so that the blade 130 tilts with reference to the tilting movement supporting member 180 (see FIG. 6).

A force generated by the electromagnet force can be expressed by the following equation, $$F=inlB$$

where 'i' denotes an electric current, 'n' denotes the number of windings of a coil, 'l' denotes a length of a coil, and 'B' denotes a magnetic field.

A force exerted on the tilting movement supporting member 180 can be expressed by the following equation, $$F=kx$$

where 'k' denotes a constant of the tilting movement supporting member and 'x' denotes a deformed length of the tilting movement supporting member.

Based on the above two equations, the length of displacement of the tilting movement supporting member 180 'x' is expressed by the following equation.

$$x=(inlB/k)$$

That is, the length of the displacement of the tilting movement supporting member 180 'x' depends on the current 'i' applied to the first and the second focusing coils 141, 142. Accordingly, the tilting movement of the blade 130 is controlled by adjusting the level of the electric current applied to the first and the second focusing coils 141, 142.

Meanwhile, error compensation with respect to the movement of the tracking direction B is achieved by the conventional method. That is, as an electric current is applied to the tracking coils 150, the blade 130 experiences a translational movement in the tracking direction B due to the electromagnetic force generated between the tracking coils 150 and the first and the second magnets 161, 162. Due to the translational movement of the blade 130 in the tracking direction B, the light spot traces the signal track without deflecting from the signal track of the optical disk 'd'. Since the translational movement of the blade 130 in the tracking direction B is well known to those of skilled in the art, a detailed description thereof will be omitted for conciseness.

As described above, the actuator for the optical pickup according to the present invention enables the object lens L to tilt in the tangential direction C. Also, albeit not shown in the drawings, the actuator may employ some parts disclosed in the above-mentioned US publication No. US2002150002 filed by the same assignee, which is incorporated herein by reference in its entirety. In this case, the blade 130 is constructed to move in an asymmetric manner with respect to the focusing direction A, so that the blade 130 tilts in a radial direction D. To accomplish this, the first and the second magnets 161, 162 may be spaced apart from a centerline of the blade 130 by a predetermined distance or the wire suspensions 171, 172, 173 having different levels of rigidity may be disposed at opposite sides of the blade 130. Accordingly, the actuator can be provided, which can move in the focusing direction A and in the tracking direction B and also tilt in the tangential direction C and in the radial direction D.

According to an embodiment of the present invention, by adjusting the level of the electric current applied to the first and the second focusing coils 141, 142, the blade 130 is allowed to tilt in the tangential direction C. Therefore, it is possible to compensate for an error caused by the optical disk 'd' deflecting from the level state in the tangential direction C and also compensate for an error caused by the rolling phenomenon of the tangential direction of the blade 130. Accordingly, the overall recording and reproducing performance of the optical disk drive improves.

While certain embodiments of the present invention have been shown and described, the present invention is not limited to those embodiments. It should be understood that various modifications and changes can be made by those skilled in the art without departing from the spirit and scope of the present invention as defined by the appended claims. It should be understood that such modifications, changes and equivalents thereof are all included within the scope of the present invention.

What is claimed is:

1. An actuator for an optical pickup of an optical disk drive, comprising:
   a blade on which an object lens is mounted;
   a plurality of magnets for generating a magnetic field;
   a plurality of focusing coils for interacting with the magnetic field generated at the magnets to move the blade in a first direction;
   a tracking coil for interacting with the magnetic field generated at the magnets to move the blade in a second direction;
   a first supporting member for supporting the blade so that the blade is tilted by the difference in electromagnetic forces which are generated between the magnets and the focusing coils; and a second supporting member connected to the first supporting member, for movably supporting the blade in the first and the second directions.

2. The actuator of claim 1, wherein the difference in electromagnetic forces generated between the magnets and the focusing coils is caused by the difference in electric currents flowing through the focusing coils.

3. The actuator of claim 1, wherein the focusing coils include a first focusing coil and a second focusing coil provided at opposing ends of the blade.

4. The actuator of claim 1, wherein the second supporting member comprises a plurality of wire suspensions.

5. The actuator of claim 4, wherein the plurality of wire suspensions comprise:
a pair of first wire suspensions connected to the blade, for applying an electric current to the first focusing coil;
a pair of second wire suspensions, for applying an electric current to the second focusing coil; and
a pair of third wire suspensions, for applying an electric current to the tracking coil.

6. The actuator of claim 5, wherein a pair of connection members are provided between the other ends of the first, second and third wire suspensions and the blade.

7. The actuator of claim 1, further comprising a connection member for connecting the first supporting member and the second supporting member.

8. The actuator of claim 1, wherein the first supporting member is a plate spring.

9. The actuator of claim 1, wherein the focusing coils and the tracking coil are disposed on the blade.

10. The actuator of claim 1, wherein the magnets are arranged at a predetermined distance from a centerline of the blade, so that a driving force of the first direction generated by the interaction with the electric current flowing through the focusing coils is exerted on the blade in an asymmetric manner.

11. The actuator of claim 1, wherein the second supporting member has different levels of rigidity and is provided in pairs at opposite sides of the blade, so that the blade is moved in an asymmetric manner with respect to the first direction.

12. An actuator for an optical pickup of an optical disk drive, which comprises:
a blade elastically supported by a holder through a supporting member;
a focusing coil and a tracking coil disposed on the blade to move the blade in a focusing direction and a tracking direction; and
a magnet for generating a magnetic field for interacting with electric currents flowing through the focusing coil and the tracking coil;
the focusing coil including a first and a second focusing coils respectively disposed at opposite ends of the blades;
the magnet including a first magnet for interacting with the first focusing coil and a second magnet for interacting with the second focusing coil;
wherein the blade is tilted in a tangential direction due to a difference in electromagnetic forces which are generated between the first focusing coil and the first magnet and between the second focusing coil and the second magnet;
and further comprising a tilting movement supporting member for biasing the blade so that the blade is tilted in the tangential direction.

13. The actuator of claim 12, wherein the difference in the electromagnetic forces generated between the first focusing coil and the first magnet and between the second focusing coil and the second magnet, is caused by a difference in electric currents flowing through the first and the second focusing coils.

14. The actuator of claim 12, wherein the tilting movement supporting member comprises a plate spring.

15. The actuator of claim 12, wherein the supporting member comprises a plurality of wire suspensions.

16. An actuator for an optical pickup of an optical disk drive, which comprises:
a blade elastically supported by a holder through a supporting member;
a focusing coil and a tracking coil disposed on the blade to move the blade in a focusing direction and a tracking direction; and
a magnet for generating a magnetic field for interacting with electric currents flowing through the focusing coil and the tracking coil;
the focusing coil including a first and a second focusing coils respectively disposed at opposite ends of the blade;
the magnet including a first magnet for interacting with the first focusing coil and a second magnet for interacting with the second focusing coil;
wherein the blade is tilted in a tangential direction due to a difference in electromagnetic forces which are generated between the first focusing coil and the first magnet and between the second focusing coil and the second magnet;
wherein the supporting member comprises a plurality of wire suspensions; and
wherein the plurality of wire suspensions comprise:
a pair of first wire suspensions each having one end connected to the holder and the other end connected to the blade, for applying an electric current to the first focusing coil;
a pair of second wire suspensions each having one end connected to the holder and the other end connected to the blade, for applying an electric current to the second focusing coil; and
a pair of third wire suspensions each having one end connected to the holder and the other end connected to the blade, for applying an electric current to the tracking coil.

17. The actuator of claim 16, wherein a pair of connection members are provided between the other ends of the first through the third wire suspensions and the blade, and the tilting movement supporting member is provided in pair to connect the blade to the pair of connection members.

18. The actuator of claim 12, further comprising a connection member for connecting the supporting member and the tilting movement supporting member.

19. The actuator of claim 12, wherein the magnets are arranged at a predetermined distance from a centerline of the blade, so that a driving force in the focusing direction generated by the interaction with the electric current flowing in the focusing coil is exerted on the blade in an asymmetric manner.

20. The actuator of claim 12, wherein the supporting member has different levels of rigidity and is provided in pairs at opposite sides of the blade, so that the blade moves in an asymmetric manner with respect to the focusing direction.

21. A method for detecting information on an optical disk drive, comprising:
mounting an object lens on a blade;
generating a magnetic field using a plurality of magnets;

interacting with the magnetic field generated at the magnets to move the blade in a first direction using a plurality of focusing coils;

interacting with the magnetic field generated at the magnets to move the blade in a second direction using a tracking coil;

supporting the blade so that the blade is tilted by the difference in electromagnetic forces which are generated between the magnets and the focusing coils using a first supporting member; and movably supporting the blade in the first and the second directions using a second supporting member connected to the first supporting member.

22. The method of claim 21, wherein the difference in electromagnetic forces generated between the magnets and the focusing coils is caused by the difference in electric currents flowing through the focusing coils.

23. The method of claim 21, wherein the focusing coils include a first focusing coil and a second focusing coil provided at opposing ends of the blade.

24. The method of claim 21, wherein the second supporting member comprises a plurality of wire suspensions.

25. The method of claim 24, further comprising:
applying an electric current to the first focusing coil using a pair of first wire suspensions connected to the blade;
applying an electric current to the second focusing coil using a pair of second wire suspensions; and
applying an electric current to the tracking coil using a pair of third wire suspensions.

26. The method of claim 25, wherein a pair of connection members are provided between the other ends of the first, second and third wire suspensions and the blade.

27. The method of claim 21, further comprising:
connecting the first supporting member and the second supporting member using a connection member.

28. The method of claim 21, wherein the first supporting member comprises a plate spring.

29. The method of claim 21, wherein the focusing coils and the tracking coil are disposed on the blade.

30. The method of claim 21, wherein the magnets are arranged at a predetermined distance from a centerline of the blade, so that a driving force of the first direction generated by the interaction with the electric current flowing through the focusing coils is exerted on the blade in an asymmetric manner.

31. The method of claim 21, wherein the second supporting member has different levels of rigidity and is provided in pairs at opposite sides of the blade, so that the blade is moved in an asymmetric manner with respect to the first direction.

* * * * *